US011647137B2

(12) United States Patent
Saravanan et al.

(10) Patent No.: US 11,647,137 B2
(45) Date of Patent: May 9, 2023

(54) PRINT MEDIA DETECTION WITH SCANNER BAR

(71) Applicant: Hewlett-Packard Development Company, L.P., Spring, TX (US)

(72) Inventors: Suriyaprakash Saravanan, Singapore (SG); Kok Chai Chong, Singapore (SG); Aiqiang Yang, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/795,980

(22) PCT Filed: Jan. 30, 2020

(86) PCT No.: PCT/US2020/015830
§ 371 (c)(1),
(2) Date: Jul. 28, 2022

(87) PCT Pub. No.: WO2021/154255
PCT Pub. Date: Aug. 5, 2021

(65) Prior Publication Data
US 2023/0051748 A1    Feb. 16, 2023

(51) Int. Cl.
*H04N 1/00* (2006.01)
*H04N 1/10* (2006.01)
*H04N 1/06* (2006.01)

(52) U.S. Cl.
CPC ....... *H04N 1/00694* (2013.01); *H04N 1/0057* (2013.01); *H04N 1/00681* (2013.01); *H04N 1/00708* (2013.01); *H04N 1/00737* (2013.01); *H04N 1/1039* (2013.01); *H04N 1/1043* (2013.01); *H04N 1/00724* (2013.01); *H04N 1/00732* (2013.01); *H04N 1/00748* (2013.01); *H04N 1/0671* (2013.01)

(58) Field of Classification Search
None
See application file for complete search history.

(56) References Cited

U.S. PATENT DOCUMENTS

| 8,430,398 | B2* | 4/2013 | Kamichi | B65H 3/0684 271/171 |
| 9,216,872 | B2 | 4/2015 | Balili | |
| 9,551,970 | B2* | 1/2017 | Wei | B41J 11/0095 |
| 9,994,410 | B2 | 6/2018 | Egawa et al. | |

(Continued)

FOREIGN PATENT DOCUMENTS

| JP | 2014166892 | 9/2014 |
| RU | 2368091 C2 | 9/2009 |
| WO | WO-2022050961 A1 * | 3/2022 |

*Primary Examiner* — Miya J Williams
(74) *Attorney, Agent, or Firm* — Brooks, Cameron & Huebsch, PLLC (57) ABSTRACT

A print media detection apparatus may include a movable scanner bar for scanning media, a feeder tray for supplying the print media, a print media indicator and a controller. The print media indicator may include a first portion to interact with the print media within the feeder tray and a second portion coupled to the first portion to move in response to movement of the first portion. The scanner bar is to sense the second portion of the media indicator. The controller is to determine a characteristic of the print media within the feeder tray based upon sensing of the second portion by the scanner bar.

15 Claims, 7 Drawing Sheets

(56) References Cited

U.S. PATENT DOCUMENTS

| | | |
|---|---|---|
| 10,146,165 B2 | 12/2018 | Yoshida et al. |
| 2005/0111059 A1 | 5/2005 | De Koning |
| 2005/0151762 A1 | 7/2005 | Griesemer |
| 2005/0206070 A1* | 9/2005 | Connors ............ G03G 15/6511 271/145 |
| 2013/0141742 A1* | 6/2013 | Lee .................... H04N 1/00769 358/1.13 |
| 2017/0180587 A1* | 6/2017 | Wilsher ............. H04N 1/00013 |
| 2021/0037145 A1* | 2/2021 | Fujiwara .................. B41J 29/38 |
| 2023/0001717 A1* | 1/2023 | Yang ........................ B65H 1/06 |

\* cited by examiner

PRINT MEDIA DETECTION WITH SCANNER BAR

BACKGROUND

Multifunction devices are often capable of both printing upon media and scanning media. The media being printed upon, the print media, is supplied from a feeder tray. The presence or absence, size or amount of print media within the feeder tray is sometimes detected to aid in the control of printing operations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example print media detection apparatus, print media detection methods and print media detection instructions that facilitate less complex and lower cost multifunction devices. The example print media detection apparatus, print media detection methods and print media detection instructions utilize the existing scan module or scanner bar, provided for scanning scan media, to detect the print media within the feed tray. As a result, additional sensors or other mechanisms to detect print media within the feed tray may be reduced or eliminated, reducing the complexity and cost of a multifunction device.

For purposes of this disclosure, "print media" refers to media that is to be printed upon. In contrast, "scan media" refers to media that is to be scanned. For purposes of this disclosure, the "detection" of print media or the "detection" of a "characteristic" of the print media may refer to the presence or absence of the print media, its size, and/or amount. In some implementations, the detected "characteristic" of print media may be utilized in combination with other sensed or user input values or other predetermined relationships to ascertain further characteristics of the print media residing in the feeder tray.

The example print media detection apparatus, print media detection methods and print media detection instructions may utilize a media indicator which extends between the feeder tray for printing and a region accessible by the scanner bar. The media indicator may have a first portion that is located or supported so as to interact with print media within the feeder tray. The media indicator may also have a second portion coupled to the first portion so as to move in response to movement of the first portion. The second portion may be movable so as to be detectable by the scanner bar. The scanner bar detects the positioning and/or movement of the second portion to correspondingly detect the characteristic of the print media that may be interacting with the first portion.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

In the following described examples, the first portion and the second portion may be integrally formed as a single unitary body, may comprise two separate structures that interact with one another or may comprise two separate structures that are operably coupled to one another by an intervening motion or movement linkage or transmission. For example, motion of the first portion may trigger corresponding or proportional second movement of an intervening coupling or transmission member that transmits the second motion or movement to the second portion to cause a second portion to correspondingly or proportionally move (a third motion or movement). This third motion or movement is detected by the scanner bar.

The "characteristics" of the "print media" within the feeder tray may be determined by a controller associating the sensed position and/or movement of the second portion to a corresponding previously empirically determined characteristic or value. The controller may consult a lookup table associating different positions with different characteristics or may calculate a characteristic using the sensed position of the media indicator. For example, a first sensed position of the second portion of the media indicator may correspond to the absence of print media within the feeder tray while a second sensed position of the second portion of the media indicator may correspond to the presence of print media within the feeder tray. A first sensed position of the second portion of the media indicator may correspond to a first size of print media within the feeder tray while a second sensed position of the second portion of the media indicator may correspond to a second different size of print media within the feeder tray. A first sensed position of the second portion of the media indicator may correspond to a first amount of media (a first thickness or number of sheets of print media) within the feeder tray while a second sensed position of the second portion of the media indicator may correspond to a second different amount of media within the feeder tray. In some implementations, one of the "sensed positions" of the media indicator may be a "zero" position, wherein the second portion of the media indicator is out of view of the scanner bar.

The determined "characteristic" of the print media may be further used by the controller in various manners. For example, the determined "characteristic" of the print media within the feeder tray may be communicated to a user of the multifunction device using a display, an indicator light, an audible notice or the like. In such a manner, the user may be notified as to whether the feeder tray is empty and is in need of print media replenishment, whether the feeder tray is approaching a state where the feeder tray is to be replenished with print media or whether the size of print media within the feeder tray is appropriate for the current print job. The notification may be made locally on the multifunction device itself or remotely, the notification being communicated in a wired or wireless fashion to a remote display, speaker or the like.

In some implementations, the determined "characteristic" of the print media may be used by the controller to control the subsequent printing upon the print media or the movement of the print media within the multifunction device. For example, based upon the determined size of print media currently residing in the feeder tray, the controller may adjust the size (e.g., font) of the image or text being printed, top, bottom and/or side margins of the image or text being printed, the chosen font or the like. The determined size of the print media currently residing in the feeder tray may be used by the controller to adjust the duration at which different sets of rollers are driven to move a sheet within the multifunction device. The duration at which the different roller sets are driven may vary depending upon the length of a sheet of media being driven through the multifunction device.

Disclosed is an example print media detection apparatus. The apparatus may include a movable scanner bar for scanning media, a feeder tray for supplying the print media, a print media indicator and a controller. The print media indicator may include a first portion to interact with the print media within the feeder tray and a second portion coupled to the first portion to move in response to movement of the first portion. The scanner bar is to sense the second portion of the media indicator. The controller is to determine a characteristic of the print media within the feeder tray based upon sensing of the second portion by the scanner bar.

Disclosed is an example print media detection method. The method may include moving a media indicator based upon interaction of the media indicator with print media within a media tray, moving a scanner bar to sense the media indicator with the scanner bar, sensing the media indicator with the scanner bar and determining a characteristic of the print media within the media tray based upon the sensing of the media indicator with the scanner bar.

Disclosed is an example non-transitory computer-readable medium that contains print media detection instructions to direct a processor. The print media detection instructions may comprise scanner bar instructions, media indicator sensing instructions and media characteristic determination instructions. The scanner bar instructions direct the processor to move a scanner bar to sense a media indicator that interacts with print media within a feeder tray that supplies the print media for being printed upon. The media indicator sensing instructions direct the processor to cause the scanner bar to sense the media indicator. The media characteristic determination instructions direct the processor to determine the characteristic of the print media based upon sensing of the media indicator.

Figure 1:
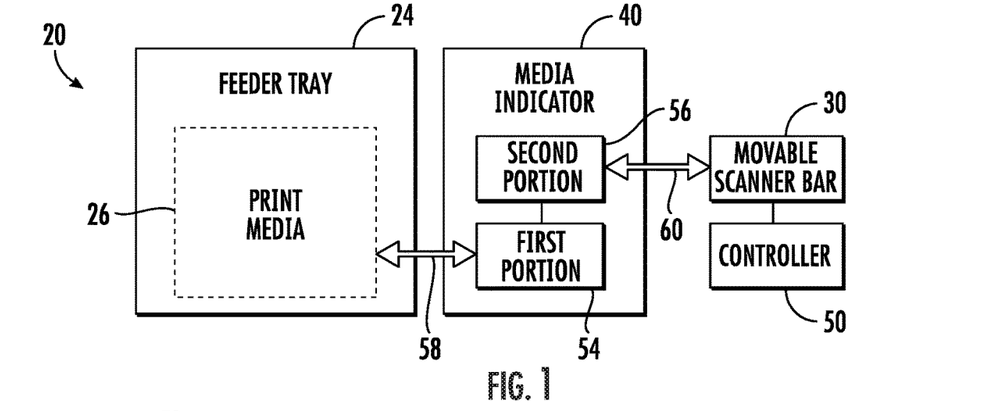
FIG. 1 is a block diagram schematically illustrating portions of an example media detection apparatus.

FIG. 1 is a block diagram illustrating portions of an example print media detection apparatus 20. Print media detection apparatus 20 may be in the form of a multifunction device that performs both printing and scanning of media. Print media detection apparatus 20 provides for lower cost and less complex detection of print media. Print media detection apparatus 20 comprises feeder tray 24, movable scanner bar 30, media indicator 40 and controller 50.

Feeder tray 24 temporarily stores or holds print media 26 (schematically represented in broken lines) which is to be fed to a printing component which prints upon the print media 26. Feeder tray 24 may be adapted to hold a single width of print media or may be adjustable to hold any one of multiple different widths of print media at any one time. Feeder tray 24 may be sized to hold a single sheet or piece of print media or may be sized to hold a stack of print media.

Movable scanner bar 30, sometimes referred to as a scanner module or optical scanning unit, comprises a device that captures images of scan media. For example, movable scanner bar 30 may sense light reflected from the face of the scan media, wherein the sensed reflected light corresponds to image or text upon a face of the scan media. Movable scanner bar 30 may be driven by an electrically powered actuator, such as a motor or the like so as to detect different positions of media indicator 40 by sensing light reflected off of the media indicator 40. In some implementations, movable scanner bar 30 is further movable so as to be driven across the scan media. In some implementations, movable scanner bar 30 is supported beneath or opposite a transparent platen upon which the scan media may rest or reside during movement of the scanner bar 30 and during the scanning of the scan media.

Media indicator 40 facilitates the detection of the print media within feeder tray 24 by the movable scanner bar 30. Media indicator 40 comprises a first portion 54 and a second portion 56. As schematically represented by arrow 58, first portion 54 comprises a structure that is to physically interact with any print media 26 currently residing in or held by feeder tray 24. Such physical interaction may involve direct contact with a face of print media 26 and/or direct contact with an edge of print media 26.

Second portion 56 comprises a structure that is coupled to the first portion 54 so as to move in response to movement of the first portion 54. As schematically represented by arrow 60, second portion 56 is supported or located such that the positioning and/or movement of second portion 56, triggered by the movement of first portion 54, is detectable by movable scanner bar 30. In one implementation, second portion 56 is integrally formed as a single unitary body with the first portion 54 such that movement of the first portion automatically results in movement of the second portion. In some implementations, second portion is operably coupled to the first portion such that movement of the first portion results in movement of the second portion. For example, second portion 56 may be a separate structure from first portion 56, but where first portion 54 is supported so as to directly engage interact second portion 56. In some implementations, first portion 54 and second portion 56 may be operably coupled to one another by an intervening motion transmitting arrangement of components such as a gear train, cam and cam follower arrangement, belt and pulley arrangement or the like.

Figure 2:
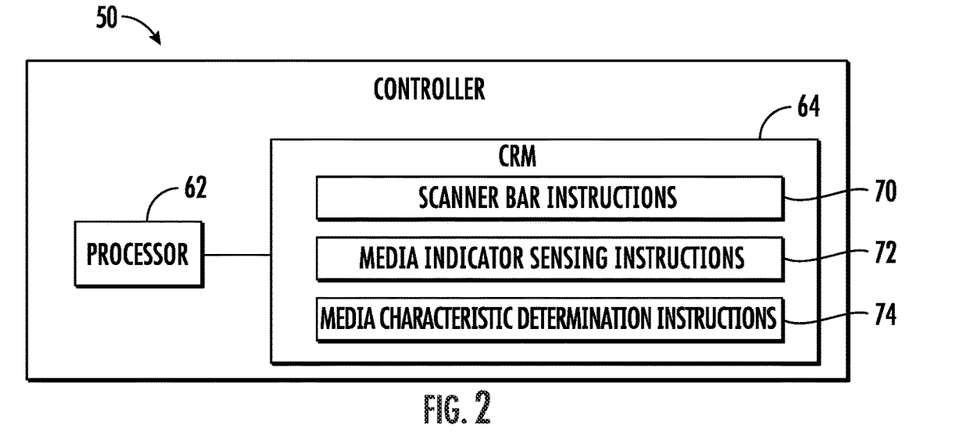
FIG. 2 is a block diagram schematically illustrating portions of an example controller of the apparatus of FIG. 1.

Controller 50 controls the positioning of movable scanner bar 30 to detect the positioning and/or movement of second portion 56. Controller 50 further utilizes the detected position and/or movement of second portion 56 to determine a characteristic of print media 26 within feeder tray 24. FIG. 2 is a block diagram illustrating one example of controller 50. As shown by FIG. 2, controller 50 comprises processor 62 and a non-transitory computer-readable medium 64 that contains instructions which are to be followed by processor 62. Computer readable medium 64 and its instructions may have various forms. For example, the instructions may comprise programming or code stored on a persistent memory. In some implementations, the instructions may be in the form of logic components which form part of an integrated circuit, such as an application-specific integrated circuit. The instructions stored on medium 64 comprise scanner bar instructions 70, media indicator sensing instructions 72 and media characteristic determination instructions 74.

Scanner bar instructions 70 direct processor 62 to output control signals for an actuator that is to move scanner bar 30. Scanner bar instructions 70 cause processor 62 to output control signals such that scanner bar 30 is moved to sense media indicator 40 that interacts with the media to be printed upon, print media 26, within media tray 24. Instructions 70 cause processor 62 to output control signals to an actuator such that scanner bar 30 is moved to position or across a range of different positions so as to sense light reflected from the second portion 56 of media indicator 40. In some implementations, instructions 70 direct processes to output control signal such that an actuator moves scanner bar 30 across a predetermined distance or that scanner bar 30 is driven for a predetermined duration of time, all while sensing light in an effort to first identify the presence of the second portion 56 of media indicator 40 and then to determine its position based upon the time at which the second portion 56 was identified during the movement of scanner bar 30. In some implementations, the instructions cause processor 62 to output control signals such that scanner bar 30 is moved across a predetermined distance or for a predetermined duration. In some implementations, the movement of scanner bar 30 may be terminated or scanner bar 30 may be returned to its default position in response to the current position of second portion 56 of media indicator 40 being identified prior to scanner bar 30 being moved across the predetermined distance or moved for the predetermined duration.

In some implementations, the movement of the scanner bar pursuant to instructions 70 may be initiated in response to controller 50 or another controller receiving a print command or receiving a digital file containing code representing text, graphics or the like that is to be printed upon a print medium. In some implementations, the movement of the scanner bar 30 pursuant to instructions 70 may be initiated at predetermined times such as at predetermined intervals following a cessation of printing or following the multifunction device being turned on.

Media indicator sensing instructions 72 direct processor 62 to output control signals causing scanner bar 30 to sense the media indicator 40. In some implementations, instructions 72 direct processor 62 to output control signals such that scanner bar 30 begins sensing immediately upon movement of scanner bar 30 throughout the full range of distances or full duration in which bar 30 is moved pursuant to instructions 64. In some implementations, instructions 72 cause processor 62 to output control signal such that scanner bar 30 senses during a window of time expected to include the time at which scanner bar 30 will be opposite to the second portion 56 of media indicator 40.

Media characteristic determination instructions 74 direct processor 62 to determine a characteristic of print media 26 based upon the sensing of the second portion 56 of media indicator 40. In some implementations, movement of first portion 54 results in second portion 56 being moved towards and away from scanner bar 30, being moved in directions that are parallel to the direction in which scanner bar 30 is movable. In such implementations, the distance that scanner bar 30 moves to sense second portion 56 corresponds to the positioning of second portion 56 of media indicator 40.

For example, processor 62 may determine the position of scanner bar 30 at the time that scanner bar 30 initially captured or sensed second portion 56. This may be determined by processor 62 multiplying the rate at which scanner bar 30 was moved from its predetermined default position and the duration of time from when scanner bar 30 began movement to when scanner bar 30 initially captured or sensed second portion 56. The distance traveled by scanner bar 30 added to the initial position of scanner bar 30 yields the position of scanner bar 30 at the time that media indicator 40 was sensed and the corresponding position of media indicator 40. The instructions 74 may direct processor 62 to then utilize the determined position of media indicator 40 to determine a corresponding characteristic of print media 26 within feeder tray 24. The controller may consult a lookup table associating different positions with different characteristics or may calculate a characteristic using the sensed position of the media indicator.

In some implementations, movement of first portion 54 results in second portion 56 moving such that different extents of second portion 56 are viewable by scanner bar 30. For example, movement of first portion 54 may result in second portion 56 moving in a direction perpendicular to the direction in which scanner bar 30 is movable. Movement of first portion 54 may result in second portion 56 moving such that an extent or length of second portion 56 retracted out of view of scanner bar 30, even when scanner bar 30 is moved to a position opposite to second portion 56, varies based upon the characteristics of the print media 26 within feeder tray 24.

For example, print media with a first characteristic may result in a first length or extent of second portion 56 being viewable by scanner bar 30 while print media with a second different characteristic may result in a second length or extent of second portion 56 being viewable by scanner bar 30. Such movement may result in different extents of second portion 56 overhanging a transparent platen and viewable by scanner bar 30. In such an implementation, scanner bar 30 may move to a position so as to sense the extent of the second portion 56 extending over the transparent platen.

Instructions 74 may direct processor 62 to then utilize the determined extent of media indicator 40 that was sensed or extending over the transparent platen to determine a corresponding characteristic of the print media 26 within feeder tray 24. The controller may consult a lookup table associating different extents of second portion 56 that were sensed with different characteristics or may calculate a characteristic using the sensed length or extent of second portion 56 of media indicator 40 that was sensed.

Figure 3:
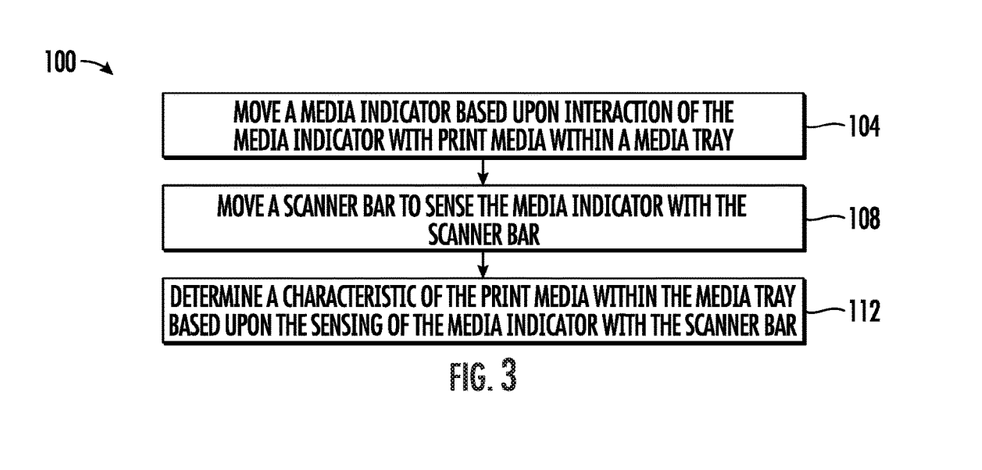
FIG. 3 is a flow diagram of an example media detection method.

FIG. 3 is a flow diagram of an example media detection method 100 that may be carried out by system 20 or by other similar media detection systems. As indicated by block 104, a media indicator, such as media indicator 40, is moved based upon interaction of the media indicator with print media within a media tray. As indicated by block 108, a scanner bar, such as scanner bar 30, is moved so as to sense the media indicator. In some implementations, the distance of the media indicator from the scanner bar varies based upon the characteristic of the print media, wherein this distance is sensed. In some implementations, the extent to which the media indicator is viewable varies based upon the characteristic of the print, wherein this extent is sensed. As indicated by block 112, based on the sensing of the media indicator with the scanner bar, a characteristic of the print media within the media tray is determined.

Figure 4:
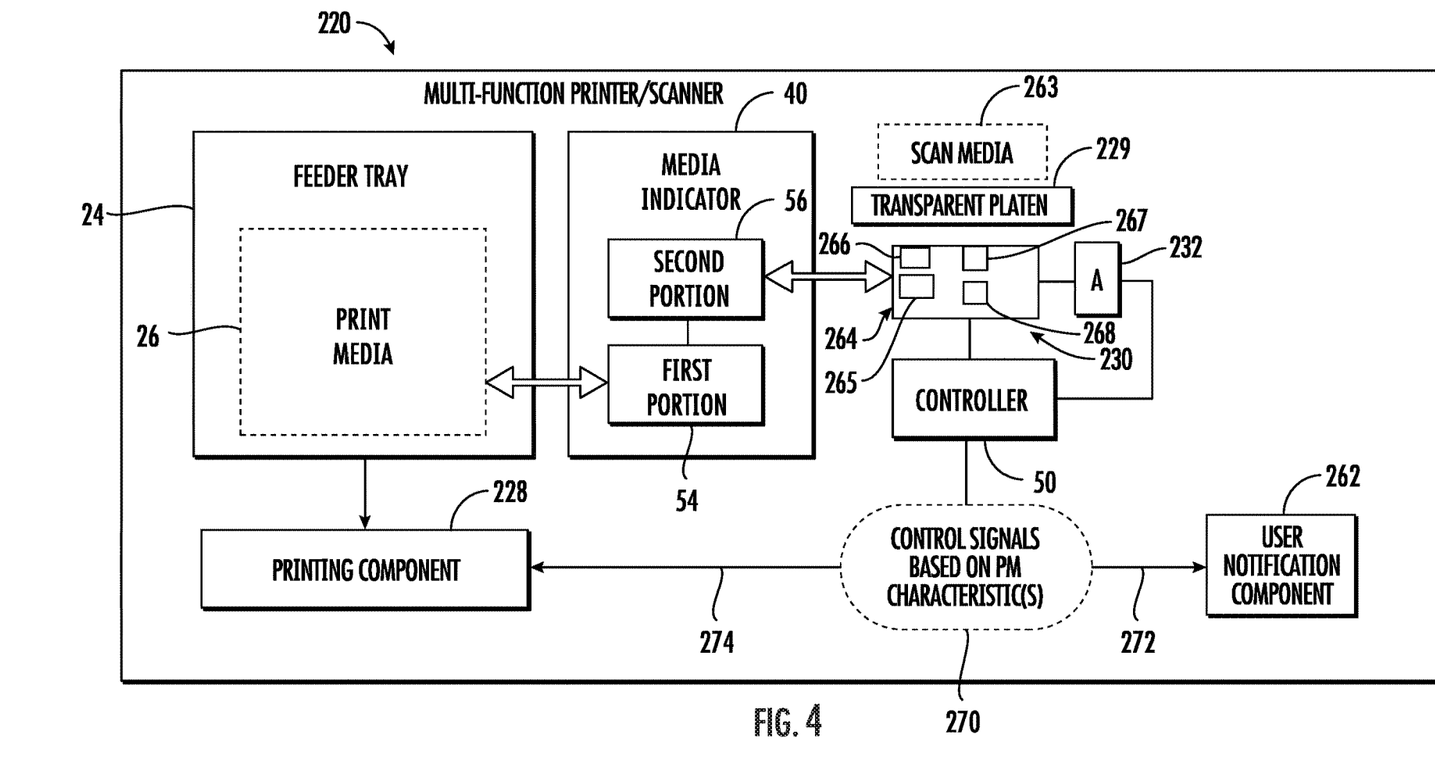
FIG. 4 is a block diagram schematically illustrating portions of an example printer/scanner.

FIG. 4 is a block diagram schematically illustrating portions of an example media detection apparatus in the form of an example multifunction printer/scanner 220. Printer/scanner 220 comprises feeder tray 24, printing component 228, transparent platen 229, movable scanner bar 230, actuator 232, media indicator 40, controller 50 and user notification component 262. Feeder tray 24, movable scanner bar 230, media indicator 40 and controller 50 are each described above.

Printing component 228 comprises a portion of printer/scanner 220 for printing on print media 26. Printing component 228 is fed with print media 26 from feeder tray 24. In some implementations, printing component 228 deposits droplets of ink onto print media 26 received from feeder tray 24. For example, in some implementations, printing component 228 may comprise an inkjet printing component having thermal resistive or piezo resistive fluid actuators that displace fluid in a firing chamber through an ejection orifice onto the print media. In other implementations, printing component may deposit toner onto the print media. In still other implementations, printing component 228 may comprise other components that selectively apply a printing material onto the face of print media 26.

Transparent platen comprises a transparent glass or polymer panel that supports scan media 263 (schematically shown in broken lines) while movable scanner bar 230 captures an image of the face of scan media 263.

Movable scanner bar 230 comprises a reflective scanner which shines light onto an object being scanned and reads the intensity (and color in some implementations) of the light that is reflected from the object. In one implementation, movable scanner bar 230 comprises a contact image scanner. In another implementation, movable scanner bar 30 comprises a charge coupled device (CCD) scanner.

As schematically represented in FIG. 4, in some implementations, movable scanner bar 230 may comprise a light source 264 provided by a light emitter 265 and a light conductor 266, a lens 267 and a sensor array 268. Light emitter 265 supplies light conductor 266 which light which is directed at the scan media 263. Light reflected from the scanned media 263 is focused by lens 267 onto the sensor array 268. In other implementations, scanner bar 230 may have other forms and arrangements of a light source and light sensor. In some implementations, one or both of the light source and sensor array may be supported by structures other than scanner bar 230, such as where light is directed by mirrors or lenses between the moving scanner bar 230 and the light source and/or sensor array.

In some implementations, light source 264 may comprise a chip supporting light emitting diodes that emit light through and along light conductor 266 which directs the light towards the scan media 263 resting upon platen 229. In other implementations, light source 264 may comprise other light-emitting devices such as a xenon or cold cathode fluorescent light source. Lens 267 focuses light reflected from scan media 263 and passing through transparent platen 229 onto sensing array 268. In one implementation, sensing array 268 may comprise an array of charge coupled devices. In some implementations, the array of charge coupled devices may comprise three rows of such sensors with respective red, green and blue filters. In some implementations, light source 264 periodically emits red, green and blue light. In the example illustrated, light conductor 266 and lens 267 may continuously extend across transparent platen 229 in a direction substantially perpendicular to the direction in which movable scanner bar 230 is driven by actuator 232.

Actuator 232 comprise a powered actuator that controllably drives and moves scanner bar 30 across and relative to transparent platen 229. As scanner bar 30 is moved across transparent plan 229 and opposite scan media 263, scanner bar 230 senses the text, images or the like on the face of scan media 264. In some implementations, transparent plan 229 and movable scanner bar 230 form what may be referred to as a flatbed scanner, wherein a sheet of print media is laid upon transparent plan 229 and movable scanner bar 30 is driven by actuator 232 below and across transparent platen 229, scanning the face of scan media 263.

User notification component 262 comprises a component that notifies a user of printer/scanner 220 regarding a determined characteristic of print media 26 within feeder tray 24. Examples of user notification component 262 include, but are not limited to, a display, an indicator and a speaker. In the example illustrated, user notification component 262 is incorporated as part of printer/scanner 220. In other implementations, user notification component 262 may comprise a remote component, wherein printer/scanner 220 communicates a notification in a wired or wireless fashion to the remote component 262. For example, in some implementations, the user notification component may comprise a separate computing device such as a desktop computer or user's portable electronic device, such as the user's laptop computer, tablet or smart phone.

As schematically represented in broken lines, upon determining a characteristic of print media 26 within feeder tray 24 based upon signals from scanner bar 230 indicating the sensed position of second portion 56, controller 50 outputs control signals 270. As indicated by arrow 272, control signals 270 may notify the user of the one or multiple determined characteristics of print media 26. For example, the user may be notified as to whether the feeder tray 24 is empty and is in need of print media replenishment, whether feeder tray 24 is full of print media, whether the feeder tray 24 is approaching a state where the feeder tray will need print media replenishment or whether the size of print media 26 within the feeder tray 24 is appropriate for the current print job.

As indicated by arrow 272, control signals 270 may control the subsequent printing upon the print media 26 or the movement of the print media 26 within the printer/scanner 220. For example, based upon the determined size of print media 26 currently residing in the feeder tray 24, the controller 50 may adjust the operation of printing component 228 to adjust the size of the image or text being printed, top, bottom and/or side margins of the image or text being printed, the chosen font or the like. The determined size of the print media 26 currently residing in the feeder tray 24 may be used by the controller 50 to adjust the duration at which different sets of rollers of the printing component are driven to move a sheet within the multifunction device. The duration at which the different roller sets are driven may vary depending upon the length of a sheet of media being driven through the printer/scanner 220.

Figure 5:
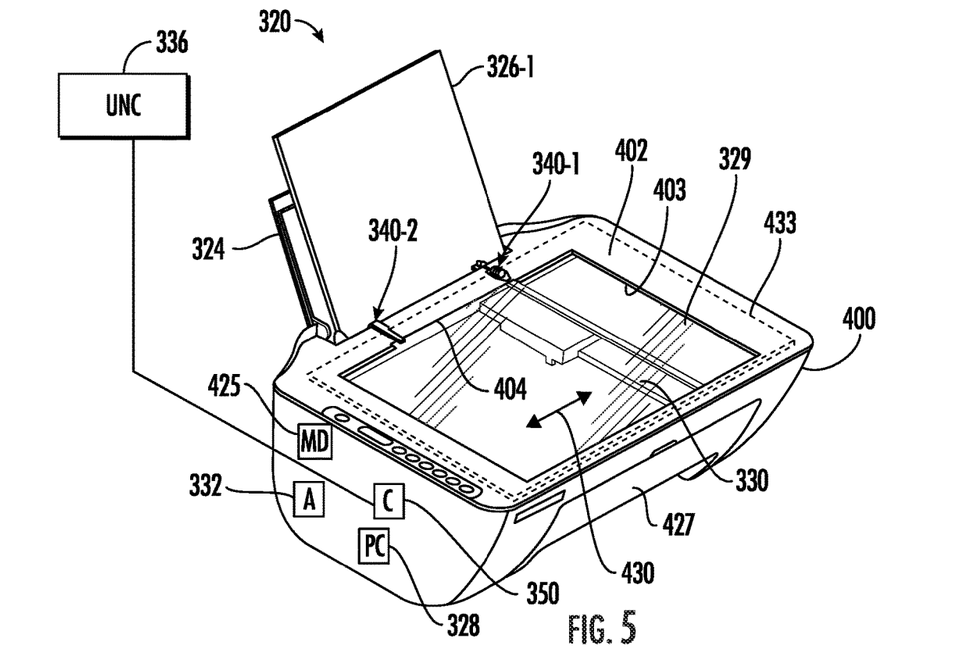
FIG. 5 is a top perspective view of an example printer/scanner.
Figure 6:
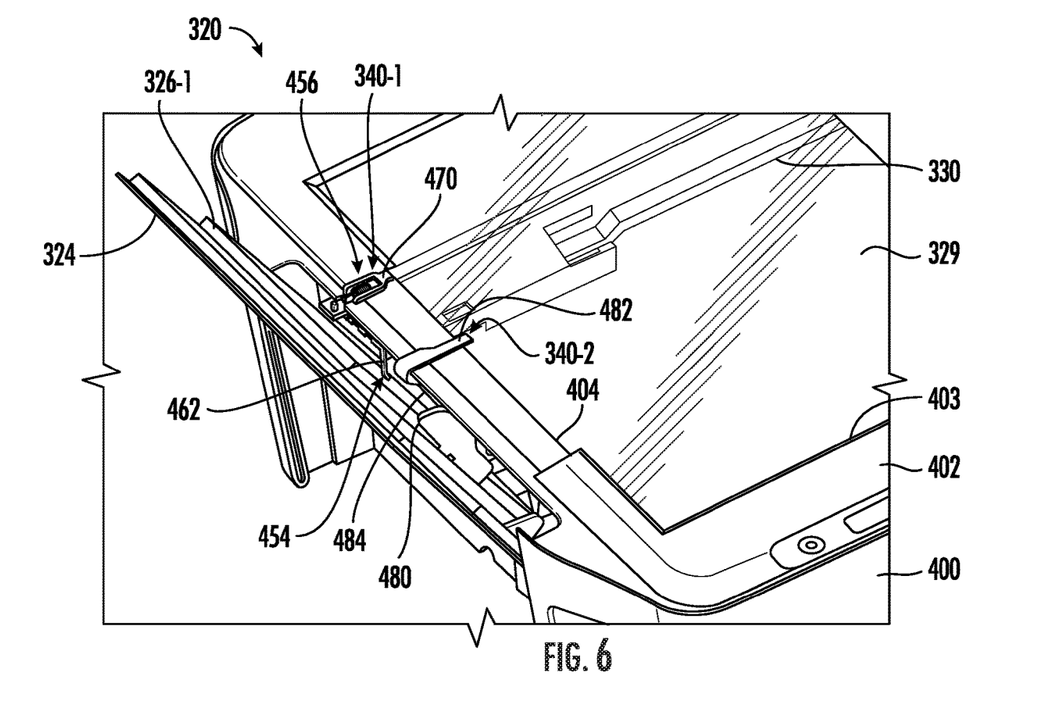
FIG. 6 is a rear perspective view of portions of the example printer/scanner of FIG. 5.

FIGS. 5 and 6 illustrate portions of an example media detection apparatus in the form of a printer/scanner 320. Printer/scanner 320 is similar to printer/scanner 220 and that printer/scanner 320 carries out both the scanning of scan media and the printing upon print media. As with printer/scanner 220, printer/scanner 320 also determines characteristics of print media held within a printer tray using the existing movable scanner bar that is used to scan the scan media. Printer/scanner 320 comprises housing 400, feeder tray 324, media drive 425, printing component 328, output tray 427, transparent platen 329, movable scanner bar 330, actuator 332, document lid 433, media indicator 340-1 and media indicator 340-2 (collectively referred to as media indicators 340), user notification component 336 and controller 350. User notification component 336 and controller 350 (schematically shown) are similar to user notification component 262 and controller 50, respectively, described above.

Housing 400 encloses remaining portions of printer/scanner 320. Housing 400 has a top frame 402, a rear supporting feeder tray 324 and a front supporting output tray 427. Top frame 402 extends around transparent platen 329. Top frame 402 comprises a main opening 403 sized for receiving a sheet or other scan media and a cutout or notch 404 into which media indicators 340-1 and 340-2 may project. Notch 404 may be dimensioned such that media indicators 340 do not project beyond notch 404 and do not interfere with the positioning or squaring of a rectangular scan medium, such as a rectangular sheet, within the remainder of top frame 402.

As should be appreciated, housing 400 may have a variety of different sizes and shapes. In some implementations, notch 404 may be omitted, where indicators 340 project over main opening 403. In some implementations, frame 402 may comprise multiple notches, a notch for each of media indicators 340.

Feeder tray 324 projects from a rear edge of housing 400 and is to support and hold various amounts of various sizes print media in the form of individual sheets of print media. In the example illustrated, feeder tray 324 is illustrated as holding a stack of print media 326-1 having a size, such as A4 print media. Feeder tray 324 projects at an upward vertical angle oblique to transparent platen 329.

Media drive 425 (schematically shown) is enclosed within housing 400 and comprises a series of idler rollers and series of driven rollers that are rotatably driven by a motor or multiple motors to drive and move individual sheets of the print media 326-1 from feeder tray 324, to printing component 328, through or across printing component 328, and from printing component 328 to output tray 427.

Printing component 328 is housed within housing 400 and is similar to printing component 228 described above. Printing component 328 is fed with individual sheets of print media from feeder tray 324. Following printing upon the print media, media drive 425 transports of print media from print component 328 to output tray 427. Output tray 427, shown in a retracted or closed state, is pivotable to an open state, projecting forward of housing 400 for holding print media that has been printed upon.

Transparent platen 329 comprises a transparent panel formed from a glass or polymer material which is supported across a top of housing 400 above movable scanner bar 330.

Movable scanner bar 330, sometimes referred to as a scanner module or optical scanning unit, directs light onto the surface of a scan media laid resting upon transparent platen 329, wherein the light reflected from the face of the scan media is focused onto a sensing array, wherein the sensing array outputs different signals based upon variations in the reflected light impinging sensing array. Movable scanner bar 330 extends across transparent platen 329, and is movable to underlie both the main opening 403 and notch 404 so as to be capable of sensing any incursion of either of media indicators 340 into notch 404. In one implementation, movable scanner bar 330 is similar to movable scanner bar 230 described above.

Actuator 332 is enclosed within housing 400 and is to move scanner bar 330 beneath and across transparent platen 329 and below notch 404 in directions indicated by arrows 430. In some implementations, scanner bar 330 is slidable along a stationary guide rod and is connected to a belt which is rotatably driven by actuator 332 in the form of a bidirectional motor. In other implementations, actuator 332 may comprise other mechanisms for controllably moving scanner bar 330 across and beneath transparent platform 329. As scanner bar 330 is moved across transparent platen 329, light is emitted from and detected by scanner bar 330.

Document lid 433 (transparently shown to illustrate the underlying components) comprises an opaque panel or sheet sized and shaped so as to cover transparent platen 329. During scanning of a sheet of scan media, the sheet of scan media is sandwiched between lid 433 and transparent platen 329. In some implementations, document lid 433 may have an underlying surface having a white color or having an underlying surface that is otherwise highly reflective.

Figure 7:
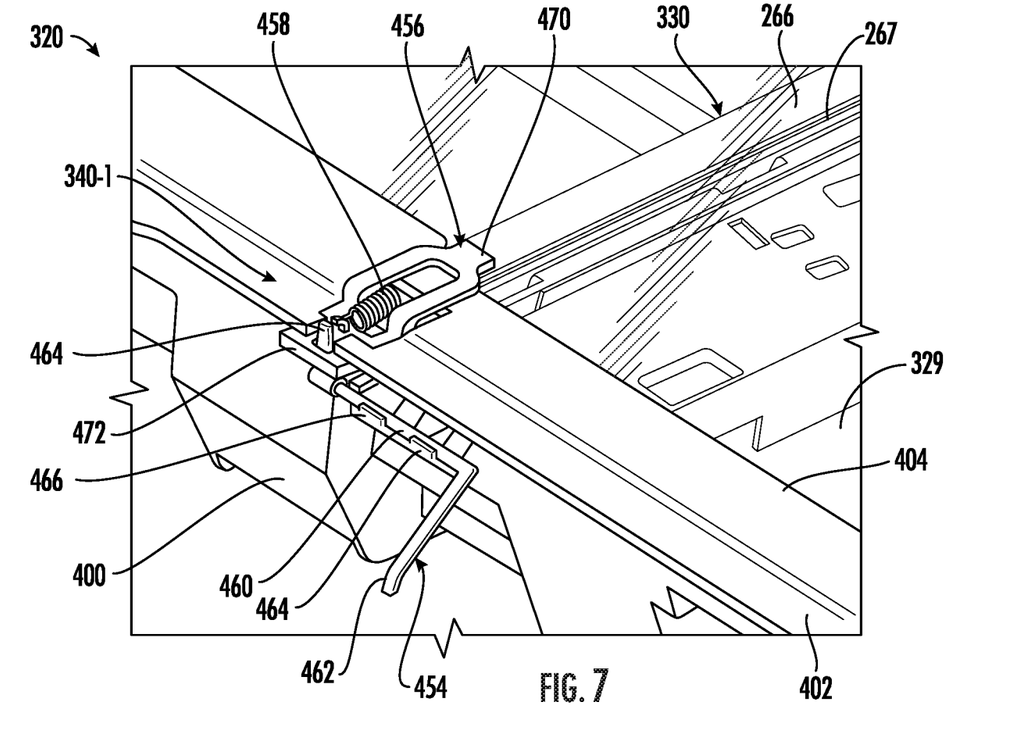
FIG. 7 is an enlarged perspective view of portions of the example printer/scanner.

Media indicator 340-1 detects multiple characteristics of print media within feeder tray 324. In the example illustrated, media indicator 340-1 detects both the presence or absence of print media within feeder tray 324 as well as the amount (the thickness of the stack) of print media within feeder tray 324. FIG. 7 illustrates media indicator 340-1 in more detail. As shown by FIG. 7, media indicator 340-1 comprises a first portion in the form of a media presence flag 454, a second portion in the form of a media presence flap 456 and a bias 458.

Media presence flag 454 interfaces between print media held within feeder tray 324 and media presence flap 456. Media presence flag 454 comprises shaft 460, finger 462 and lever 464. Shaft 460 pivotably supports finger 462 and lever 458. In the example illustrated, shaft 460 is pivotally supported by housing 400 by a pair of C-shaped guides 466 provided by housing 400 which receive shaft 460 and permit shaft 462 rotate. In other implementations, finger 462 and lever 464 may be pivotably are otherwise movably supported in other fashions.

Finger 462 extends from shaft 460 and has a length so as to extend across the depth of feeder tray 324. Finger 462 is to interact with any print media within feeder tray 324, wherein such interaction results in finger 462 and shaft 460 pivoting or rotating.

Lever 464 projects from shaft 460 and engages media presence flap 456. Media presence flap 456 comprises a structure movably supported along the rear edge of frame 402. Media presence flap 456 comprises a projecting portion 470 and a catch 472. Projecting portion 470 is movable between different positions in which projecting portion 470 projects into notch 404 and over transparent platen 329 by different extents. Catch 472 interacts with lever 464 such that pivotal movement of lever 464 moves projecting portion 470 between the different positions. In the example illustrated, lever 464 projects through is movable within an opening through catch 472.

Bias 458 resiliently biases flap 456 and projecting portion 470 towards a position in which projecting portion 470 extends into notch 404 by a greatest extent. In the example illustrated, bias 458 comprises a tension spring having a first end connected to flap 456 and a second and connected to frame 402 between notch 404 and lever 464. In the example illustrated, rotational movement of shaft 460 resulting from the interaction of finger 462 with print media within feeder tray 324 causes lever 464 to exert a force upon catch 472 so as to translate projecting portion 456 against the bias 458 to a more retracted position with respect to notch 404 and platen 329.

Although bias 458 is illustrated as biasing projecting portion 470 towards a position in which projecting portion 470 projects into notch 404 and over platen 329 by a greatest extent, in other implementations, bias 458 may bias projecting portion 470 towards a position at which projecting portion 470 is retracted or removed from notch 404 and remove from platen 329 by greatest extent. In such an implementation, media presence flag 454 may be constructed and supported such the presence or greater amount of print media within feeder tray 324 pivots lever 464 so as to move media presence flap 456 against bias 458 towards a different position at which projecting portion 470 projects into notch 404 and over platen 329 by a greater extent. As will be described hereafter, the extent to which projecting portion 470 projects into notch 404 and over platen 329 is sensed by scanner bar 330, facilitating the detection of the presence of print media within feeder tray 324 and/or the amount of print media within feeder tray 324.

Figure 8A:
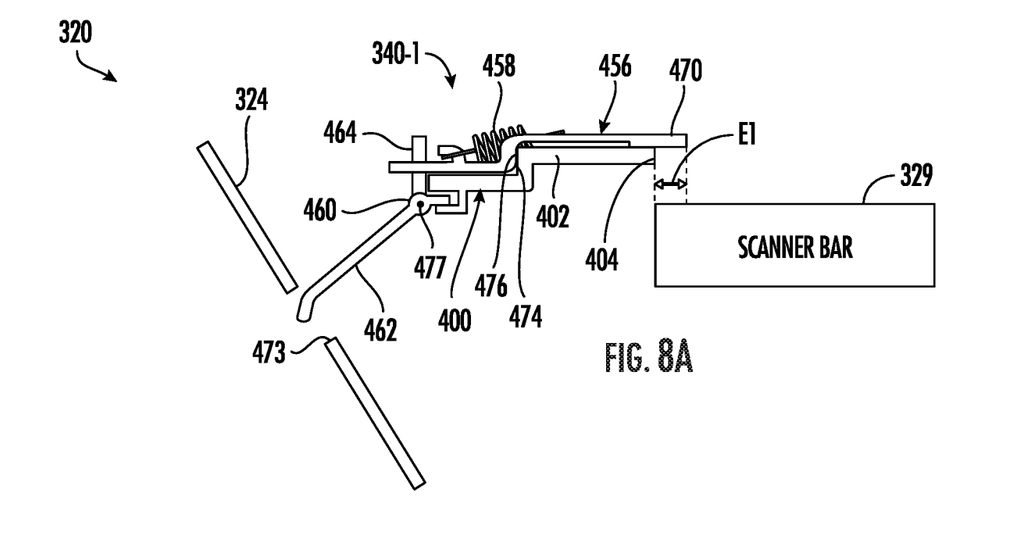
FIG. 8A is a side view illustrating portions of an example media indicator of the example printer/scanner of FIG. 5 with an empty example feeder tray.
Figure 8B:
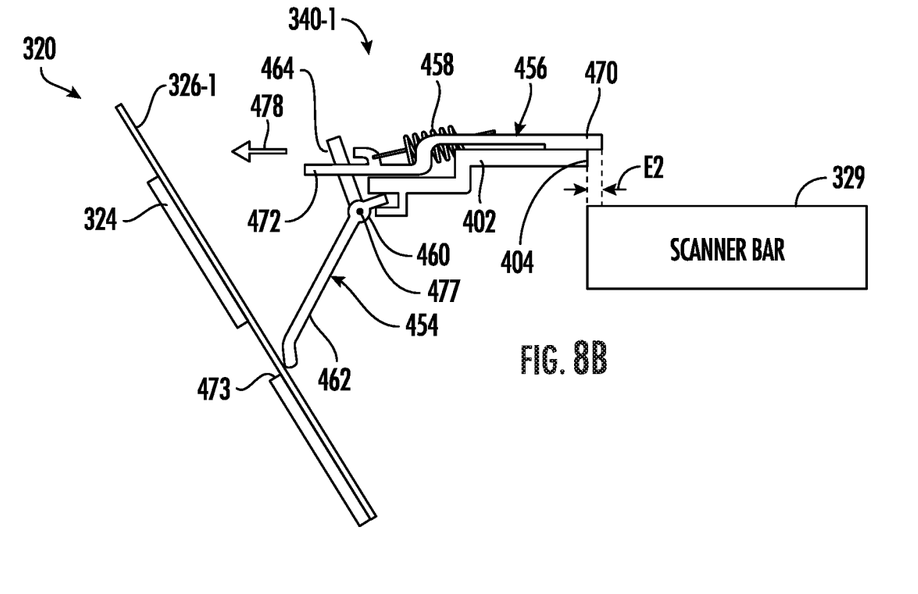
FIG. 8B is a side view illustrating portions of the example media indicator of the example printer/scanner of FIG. 5 with a first amount of print media in the feeder tray.
Figure 8C:
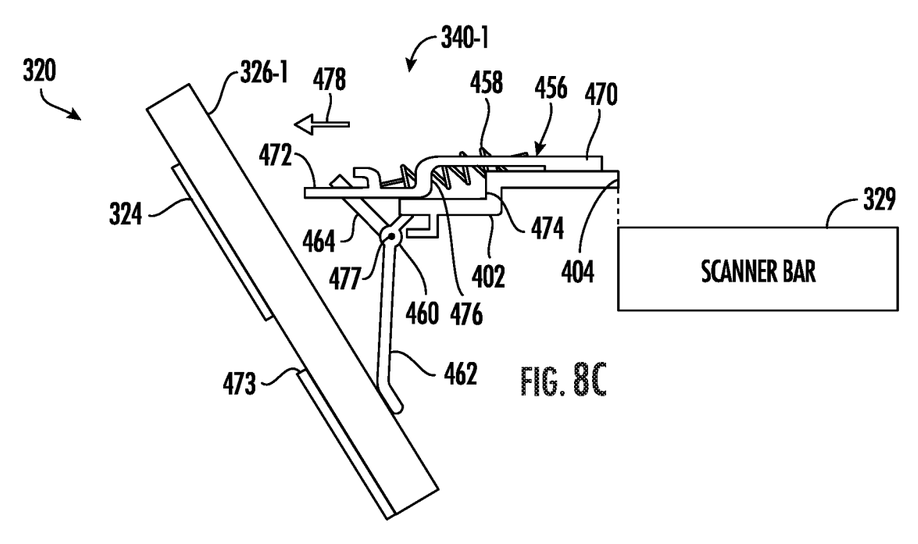
FIG. 8C is a side view altering portions of the example media indicator of the example printer/scanner of FIG. 5 with the feeder tray being full of print media.

FIGS. 8A, 8B and 8C illustrate the operation of media detector 340-1. FIG. 8A illustrates a circumstance where feeder tray 324 is empty; print media is not present within feeder tray 324. As a result, finger 462 extends across the full depth of feeder tray 324, under the force of bias 458. In the example illustrated, finger 462 has a length greater than the depth of feeder tray 324 so as to extend through an aperture 473 extending through feeder tray 324.

As further shown by FIG. 8A, the lack of print media within feeder tray 324 results in bias 458 urging media presence flap 456 and it projecting portion 470 to the position shown at which connecting portion 470 projects into notch 404 and over scanner bar 329 (when moved to a position opposite to connecting portion 470) by greatest extent E1. In the example illustrated, frame 402 comprises a shoulder 474 which abuts a corresponding shoulder 476 of flap 456 to establish extent E1 and the positioning of finger 462 when no media is present.

The sensing of the presence of print media within feeder tray 324 and/or the sensing of the amount of print media within feeder tray 324 is initiated by moving scanner bar 329 to a position opposite to projecting portion 470 or across projecting portion 470. While at the position opposite to projecting portion 470 or while being moved across projecting portion 470, scanner bar 329 is actuated to emit and reflect light off of projecting portion 470, wherein the light reflected off of projecting portion 470 is sensed. Controller 350 then analyzes the signals from scanner bar 329 to determine the extent to which projecting portion 470 is projecting over scanner bar 329. Controller 350 compares the determined extent E1 to a predefined threshold. In the example illustrated, the extent E1 exceeds the predefined threshold, indicating that feeder tray 324 is empty of print media. In such a circumstance, controller 350 may output control signals causing the user notification component 336 to notify the user that feeder tray 324 should be replenished with print media.

FIG. 8B illustrates a circumstance where feeder tray 324 holds a first amount of print media 326-1, whether it be one sheet or multiple sheets. The presence of print media 326-1 within feeder tray 324 occludes or blocks the aperture 473, preventing finger 462 from fully extending through aperture 473. As a result, the print media 326-1 within feeder tray 324 retains media presence flag 454 in the pivoted state in which media presence flag 454 is pivoted in a counterclockwise direction about axis 477 against the force of bias 458. In this pivoted state, lever 464 has been moved in the direction indicated by arrow 478 to also translate media presence flap 456 in the direction indicated by arrow 478 against the force of bias 458. As a result, media presence flap 456 and its projecting portion 470 project into notch 404 and over scanner bar 329 (when moved to a position opposite to connecting portion 470) by an extent E2 which is less than extent E1 shown in FIG. 8A.

As described above, the sensing of the presence of print media within feeder tray 324 and/or the sensing of the amount of print media within feeder tray 324 is initiated by moving scanner bar 329 to a position opposite to projecting portion 470 or across projecting portion 470. While at the position opposite to projecting portion 470 or while being moved across projecting portion 470, scanner bar 329 is actuated to emit and reflect light off of projecting portion 470, wherein the light reflected off of projecting portion 470 is sensed. Controller 350 then analyzes the signals from scanner bar 329 to determine the extent to which projecting portion 470 is projecting over scanner bar 329. Controller 350 compares the determined extent E2 to the predefined threshold corresponding to an empty feeder tray. Because the extent E2 is less than the predefined threshold, controller 350 determines that media is present within feeder tray 324.

In some implementations, controller 350 (schematically shown in FIG. 5) further determines or estimates the amount of print media within feed tray 324, the thickness or the number of sheets of print media within feed tray 324. In some implementations, controller 350 may consult a lookup table associating different extents with different amounts of print media within feeder tray 324 or may calculate the amount of print media in feeder tray 324 using the sensed position of the media indicator. For example, the extent E2 may correspond to a first amount of media within the feeder tray 324. In some implementations, controller 350 may use the determined extent E2 as part of a formula to calculate the amount of print media within feed tray 324.

Depending upon the amount of print media 326-1 within feeder tray 324, projecting portion 470 may project beyond the internal edge and into notch 404 by other extents which correspond to other non-zero amounts of print media within feeder tray 324. Controller 350 may determine such other non-zero amounts of print media within feeder tray 324 based upon the sensed extent that projecting portion 470 projects into notch 404. In circumstances where the determined amount of print media within feeder tray 324 is less than a predefined threshold, controller 350 may output control signals causing the user notification component 336 to notify the user that the amount of print media is getting low.

FIG. 8C illustrates the feeder tray 324 of printer/scanner 320 holding a full stack of print media 326-1. In the circumstance shown in FIG. 8C, the print media 326-1 within feeder tray 324 retains media presence flag 454 in the pivoted state in which media presence flag 454 is pivoted in a counterclockwise direction about axis 477 against the force of bias 458. In this pivoted state, lever 464 has been further moved in the direction indicated by arrow 478 to translate media presence flap 456 also in the direction indicated by arrow 478 against the force of bias 458. As a result, media presence flap 456 and its projecting portion 470 are completely retracted from and out of notch 404. Signals from scanner bar 329 may indicate that projecting portion 470 is completely retracted, a projecting extent of zero. In response to the projecting extent being zero, project portion 470 completely retracted out of notch 404 or from platen 329, controller 350 may output control signals causing user notification component 336 to notify the user that feeder tray 324 is currently full. In some implementations, rather than a full state corresponding to a complete retraction of projecting portion 470, a full state of feeder tray 324 may alternatively correspond to a sensed projecting extent of projecting portion 470 being greater than zero but less than a predefined threshold.

FIGS. 9, 10, 11A and 11B illustrate media indicator 340-2. Media indicator 340-2 indicates a size or dimension of the print media within the feeder tray. As with media indicator 340-1, media indicator 340-2 has a first portion that interacts with print media within feeder tray 324 and a second portion that is to be sensed by scanner bar 330. Media indicator 340-2 facilitates the detection of the size of print media currently residing in the feeder tray 324 in a less complex and less costly manner. Media indicator 340-2 comprises a first portion in the form of edge engager 480, a second portion in the form of media width flap 482 and an intermediate sliding support 484.

Figure 9:
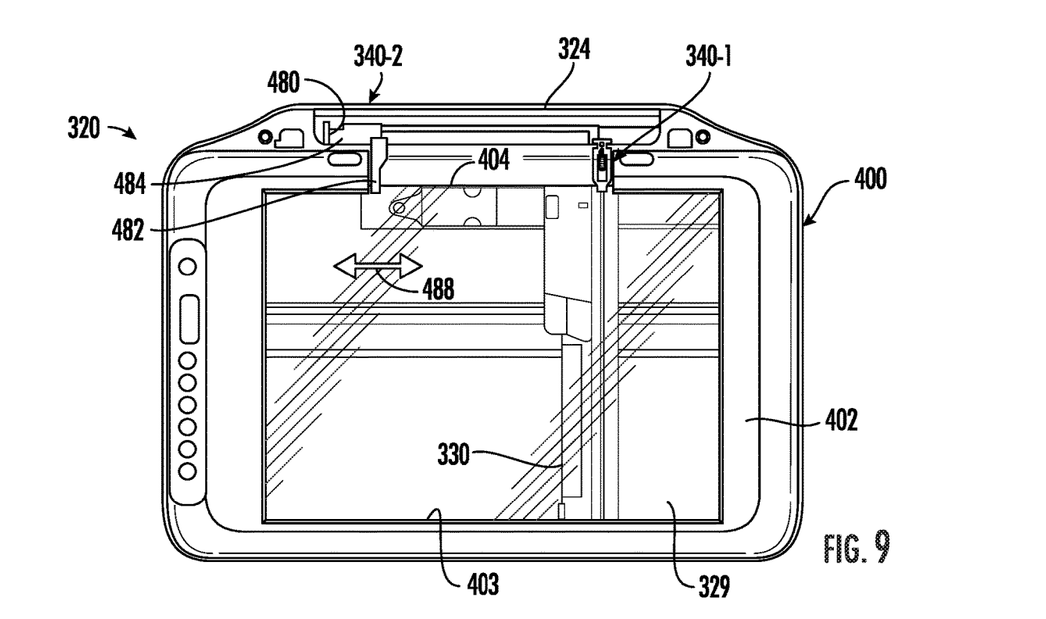
FIG. 9 is a top view illustrating portions of the example printer/scanner of FIG. 5.

Edge engager 480 comprises a structure projecting within the volume of feeder tray 324 and providing a surface 486 that is to directly abut and contact an edge of print media within feeder tray 324. Media width flap 482 is directly or indirectly coupled to edge engager 480 so as to move with movement of edge engager 480. Edge engager 480 and media width flap 482 both move in directions indicated by arrows 488, in directions parallel to the direction which scanner bar 330 is driven across platen 329. Media width flap 482 projects into notch 404 and moves between different positions along a length of notch 404 based upon the movement of edge engager 480 between different positions within feeder tray 324.

In the example illustrated, media width flap 482 is contained within notch 404, avoiding interference with the squaring of media within main window 403 over platen 329. In implementations that omit notch 404, media width flap 42 may be moved along an edge of the main window 403. Although illustrated as a generally rectangular tab, media width flap 482 may have any shape that may be sensed by scanner bar 330.

Intermediate sliding support 484 couples edge engager 480 and media width flap 482 while slidably supporting both along an axis parallel to the directions indicated by arrows 488. In some implementations, sliding support 484 may comprise a cylindrical rod slidably supportable within a C-shaped channel or groove provided by housing 400 and that extends along an axis parallel to the direction indicated by arrows 488. In other implementations, sliding support 484 may comprise part of a tongue and groove arrangement for slidably supporting media indicator 340-2 relative to housing 400 along platen 329. In other implementations, the sliding support of media indicator 340-2 may be achieved with other mechanical arrangements. Although edge engager 480, media width flap 482 and intermediate sliding support 484 are formed as a single unitary body, reducing complexity and cost, and other implementations, such components may be separately formed and operably coupled to one another by intermediate mechanical transmissions.

Figure 10:
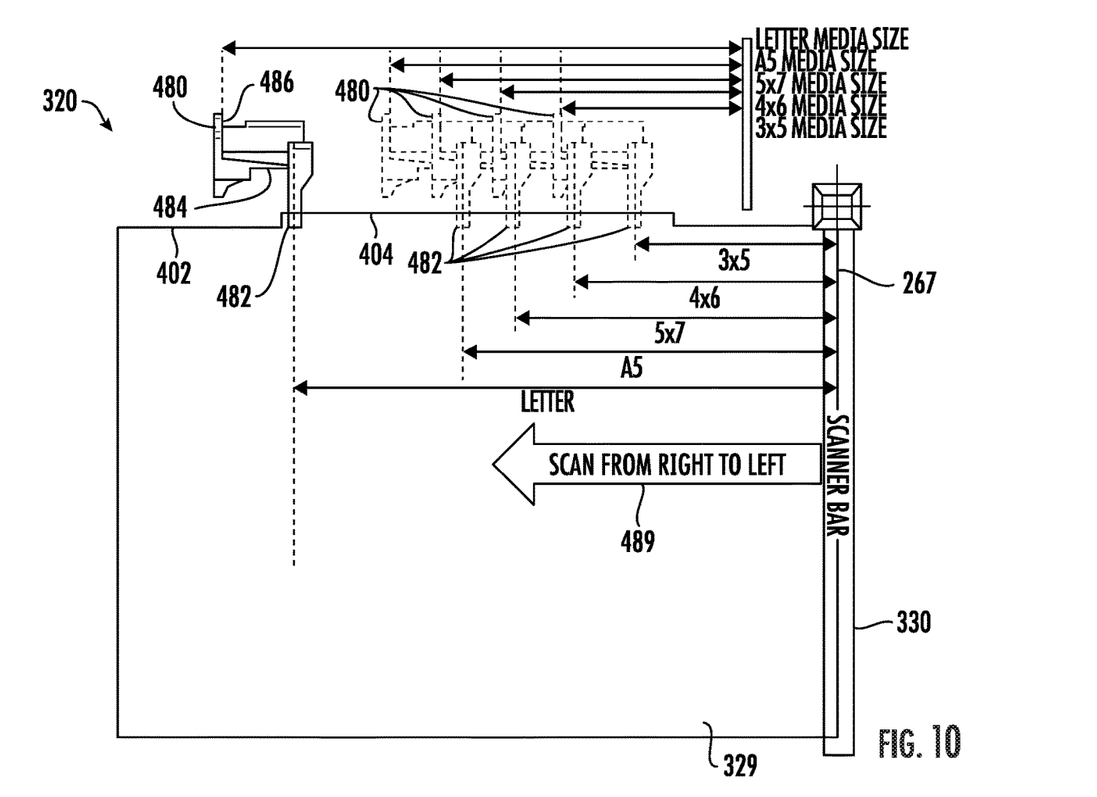
FIG. 10 is a top view of the example printer/scanner of FIG. 5 illustrating different alternative positions of an example second media indicator correspond to different example media sizes.

FIG. 10 is a top view illustrating portions of printer/scanner 320 with media indicator 340-2 in various positions corresponding to different sizes of print media that may be present within feeder tray 324. FIG. 10 illustrates edge engager 480 in different alternative positions wherein edge engager 480 would be engaging the left edge of letter media size, A5 media size, 5×7 media size, 4×6 media size and 3×5 media size. Scanner bar 330 is illustrated at a home position such that the lens 267 corresponding to the scanning line of scanner bar 330 is at the default home coordinates. To initiate the detection of the size of print media currently residing in feeder tray 324, scanner bar 330 is moved in the direction indicated by arrow 489. During such movement, signals from scanner bar 330 are continuously or periodically transmitted to controller 350 which analyzes the signal to determine or identify the time at which media width flap 42 is present (signals representing a change in characteristics of the reflected light sensed by the sensing array associated with scanner bar 330). By determining the distance traveled by scanner bar 330 (duration of travel multiplied by the rate of travel), controller 350 may determine the relative positioning of media width flap 482. As shown by FIG. 10, the determined position of media width flap 482 may be used by controller 352 identify the size of print media currently residing within feeder tray 324.

Figure 11A:
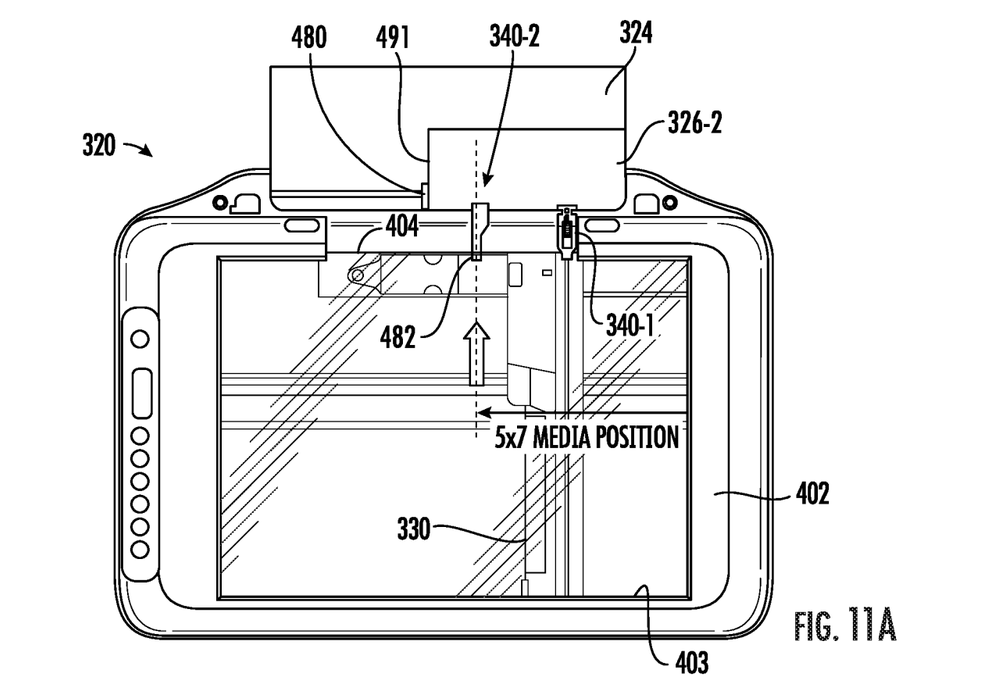
FIG. 11A is a top view of the example printer/scanner of FIG. 5 with the example second media indicator engaging a first size of print media within the feeder tray.
Figure 11B:
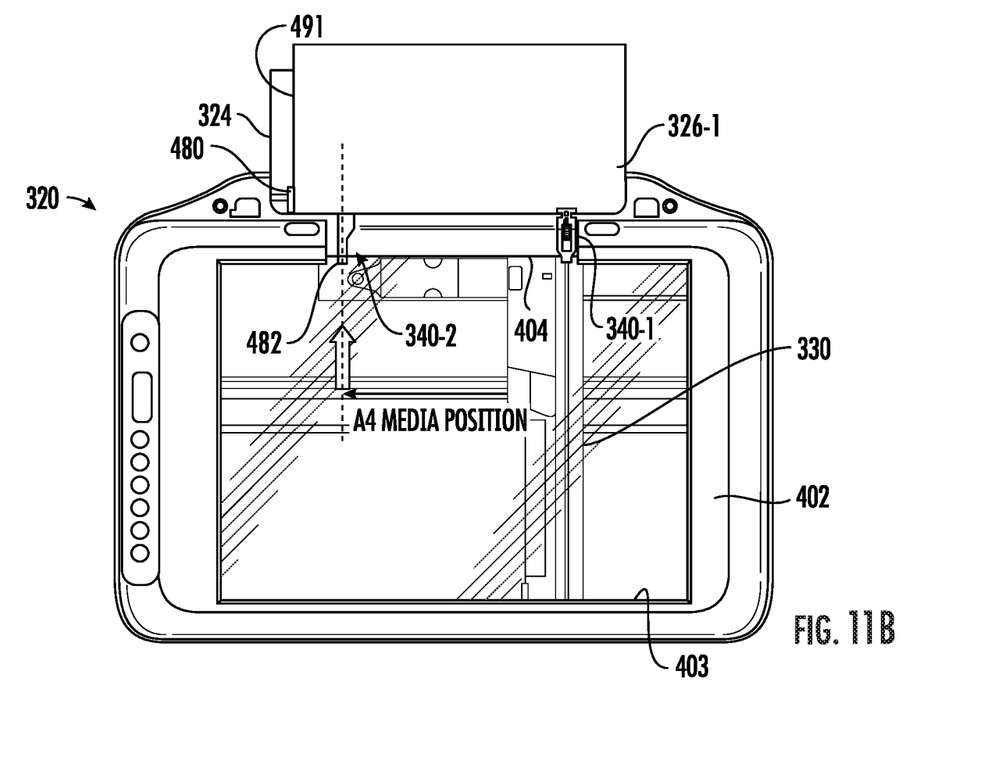
FIG. 11B is a top view of the example printer/scanner of FIG. 5 with the example second media indicator engaging a second size of print media within the feeder tray.

FIGS. 11A and 11B are top views illustrating different examples of differently sized print media 326-1 and 326-2 residing within feeder tray 324. As shown by such figures, a user may manually slide media indicator 340-2, left to right (as seen in FIG. 11A), until edge engager 480 abuts the edge 491 of the print media. The positioning of media width flap 482 will correspondingly move to a position dependent upon the position of edge engager 480.

As described above, controller 350 outputs control signals causing scanner bar 330 to move right to left while controller 350 receives signals from scanner bar 330. Controller 350 analyzes such signals to determine the current position of media width flap 482. Controller 350 may then consult a lookup table associating different positions of media width flap 482 to different media widths. Upon identifying the current width of the print media siding within feeder tray 324, controller 350 (shown in FIG. 5) may output control signals causing user notification component 3362 notify the user of the current size of the print media within feeder tray 324.

In some implementations, controller 350 may further output control signals adjusting the operation printing component 328 and/or adjusting the operation of media drive 425. Controller 350 may help control signals to printing component 328 to adjust the size of the image or text being printed, top, bottom and/or side margins of the image or text being printed, the chosen font or the like. Controller 350 may further output control signals to media drive 425 to adjust the duration at which different sets of rollers of the printing component are driven to move a sheet within the multifunction device. The duration at which the different roller sets are driven may vary depending upon the length of a sheet of media being driven through the printer/scanner 220. The length of the sheet of print media may be determined based upon the determined width of the media sheet. For example, controller 350 may determine that a sheet having a determined width of 8.5 inches is probably a letter-size sheet of media having a corresponding length of 11 inches.

Although the present disclosure has been described with reference to example implementations, workers skilled in the art will recognize that changes may be made in form and detail without departing from disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A print media detection apparatus comprising:
   a movable scanner bar for scanning media;
   a feeder tray for supplying the print media;
   a media indicator comprising:
   a first portion to interact with the print media within the feeder tray; and
   a second portion coupled to the first portion to move in response to movement of the first portion, wherein the scanner bar is to sense the second portion of the media indicator; and
   a controller to determine a characteristic of the print media within the feeder tray based upon sensing of the second portion by the scanner bar.

2. The apparatus of claim 1, wherein the characteristic is a presence or absence of the print media within the feeder tray.

3. The apparatus of claim 1, wherein the characteristic is a size of the print media within the feeder tray.

4. The apparatus of claim 1, wherein the characteristic is an amount of the print media within the feeder tray.

5. The apparatus of claim 1 further comprising a second media indicator to interact with the print media within the feeder tray, the second media indicator comprising
   a third portion to interact with the print media within the feeder tray; and
   a fourth portion coupled to the third portion to move in response to movement of the third portion, wherein the scanner bar is to sense the third portion of the media indicator,
   wherein the controller is to determine a second characteristic of the print media within the feeder tray based upon sensing of the fourth portion by the scanner bar.

6. The apparatus of claim 1, wherein the second portion intersects a volume of the media tray, the second portion being movable in response to the volume of the print media tray being occupied by the media, wherein the characteristic is a presence or absence of the print media within the feeder tray.

7. The apparatus of claim 6, wherein the controller is to determine a second characteristic of the print media within the media tray based upon sensing of the second portion by the scanner bar, the second characteristic of the media comprising an amount of the print media within the feeder tray.

8. The apparatus of claim 7, further comprising a second media indicator to interact with the print media within the feeder tray, the second media indicator comprising
   a third portion to interact with the print media within the feeder tray; and
   a fourth portion coupled to the third portion to move in response to movement of the third portion, wherein the scanner bar is to sense the third portion of the media indicator, wherein the controller is to determine a second characteristic of the print media within the feeder tray based sensing of the fourth portion by the scanner bar.

9. The apparatus of claim 8; wherein the third portion is to engage an edge of the print media within the feeder tray, wherein the second characteristic is a size of the print media within the feeder tray.

10. The apparatus of claim 6, further comprising a second media indicator to interact with the print media within the feeder tray, the second media indicator comprising:
    a third portion to interact with the print media within the feeder tray; and
    a fourth portion coupled to the third portion to move in response to movement of the third portion,
    wherein the scanner bar is to sense the third portion of the media indicator, wherein the controller is to determine a second characteristic of the print media within the feeder tray based sensing of the fourth portion by the scanner bar.

11. The apparatus of claim 5, wherein the first portion and the second portion are pivotable based upon the presence of the print media within the feeder tray and wherein the third portion and the fourth portion are translatable based upon positioning of the edge of the print media within the feeder tray.

12. The apparatus of claim 1, wherein the first portion is to engage an edge of the print media within the feeder tray, wherein the characteristic is a size of the print media within the feeder tray.

13. A print media detection method comprising:
    moving a media indicator based upon interaction of the media indicator with print media within a media tray;
    moving a scanner bar to sense the media indicator with the scanner bar;
    sensing the media indicator with the scanner bar; and
    determining a characteristic of the print media within the media tray based upon the sensing of the media indicator with the scanner bar.

14. The method of claim 13, wherein the characteristic is selected from a group of characteristics consisting of: a presence or absence of the print media within the media tray; an amount of the print media within the media tray and a size of the print media within the media tray.

15. A non-transitory computer-readable medium containing print media detection instructions to direct a processor, the print media detection instructions comprising:
    scanner bar instructions to direct the processor to move a scanner bar to sense a media indicator that interacts with print media within a feeder tray that supplies the print media for being printed upon;

media indicator sensing instructions to direct the processor to cause the scanner bar to sense the media indicator; and media characteristic determination instructions to direct the processor to determine the characteristic of the print media based upon sensing of the media indicator.

* * * * *